United States Patent [19]

Ledeen

[11] 4,307,750
[45] Dec. 29, 1981

[54] SYSTEM FOR PRECISE POSITION CONTROL

[75] Inventor: William P. Ledeen, Cupertino, Calif.

[73] Assignee: Ledeen Flow Control Systems, Inc., Sun Valley, Calif.

[21] Appl. No.: 111,900

[22] Filed: Jan. 11, 1980

Related U.S. Application Data

[63] Continuation-in-part of Ser. No. 903,727, May 8, 1978, abandoned.

[51] Int. Cl.³ .................... F16K 31/02; F16K 31/42
[52] U.S. Cl. .................................. 137/487.5; 91/6; 91/449
[58] Field of Search .................. 91/6, 449, 415; 137/599, 487.5

[56] References Cited

U.S. PATENT DOCUMENTS

| | | | |
|---|---|---|---|
| 764,240 | 7/1904 | Hinman | 91/6 |
| 2,390,425 | 12/1945 | Crum | 91/464 X |
| 2,998,515 | 8/1961 | Campbell et al. | 91/449 |
| 2,999,482 | 9/1961 | Bower | 91/6 X |
| 3,635,020 | 1/1972 | Mahlmann | 91/449 X |
| 3,700,396 | 10/1972 | Adams | 91/461 X |
| 3,776,249 | 12/1973 | Wailes et al. | 137/487.5 X |
| 3,890,992 | 6/1975 | Wolz et al. | 137/487.5 X |
| 3,973,595 | 8/1976 | Schmoll | 91/449 X |
| 4,019,585 | 4/1977 | Dezelan | 91/445 X |
| 4,244,396 | 1/1981 | Friedland et al. | 137/599 X |

Primary Examiner—Irwin C. Cohen
Attorney, Agent, or Firm—Melvin R. Stidham

[57] ABSTRACT

A hydraulic system for precise positioning of a control device, such as a valve actuator. A double-acting, hydraulic cylinder, which operates the control device, is held in any set position by a hydraulic lock ensured by one-way check valves which prevent interflow between the chambers on opposite sides of the piston. Occurrence of a signal indicating a need to change position activates one of two three-way directional control valves allowing exhaust flow from the appropriate cylinder volume. Connected in parallel in the exhaust line is a plurality of on-off valves, each having a flow capacity that is some multiple of that of the next smaller valve, e.g. twice as large. This provides a wide range of distinct and precise flow capacities to provide close and instantaneous control over rate of movement of the positioning device.

7 Claims, 2 Drawing Figures

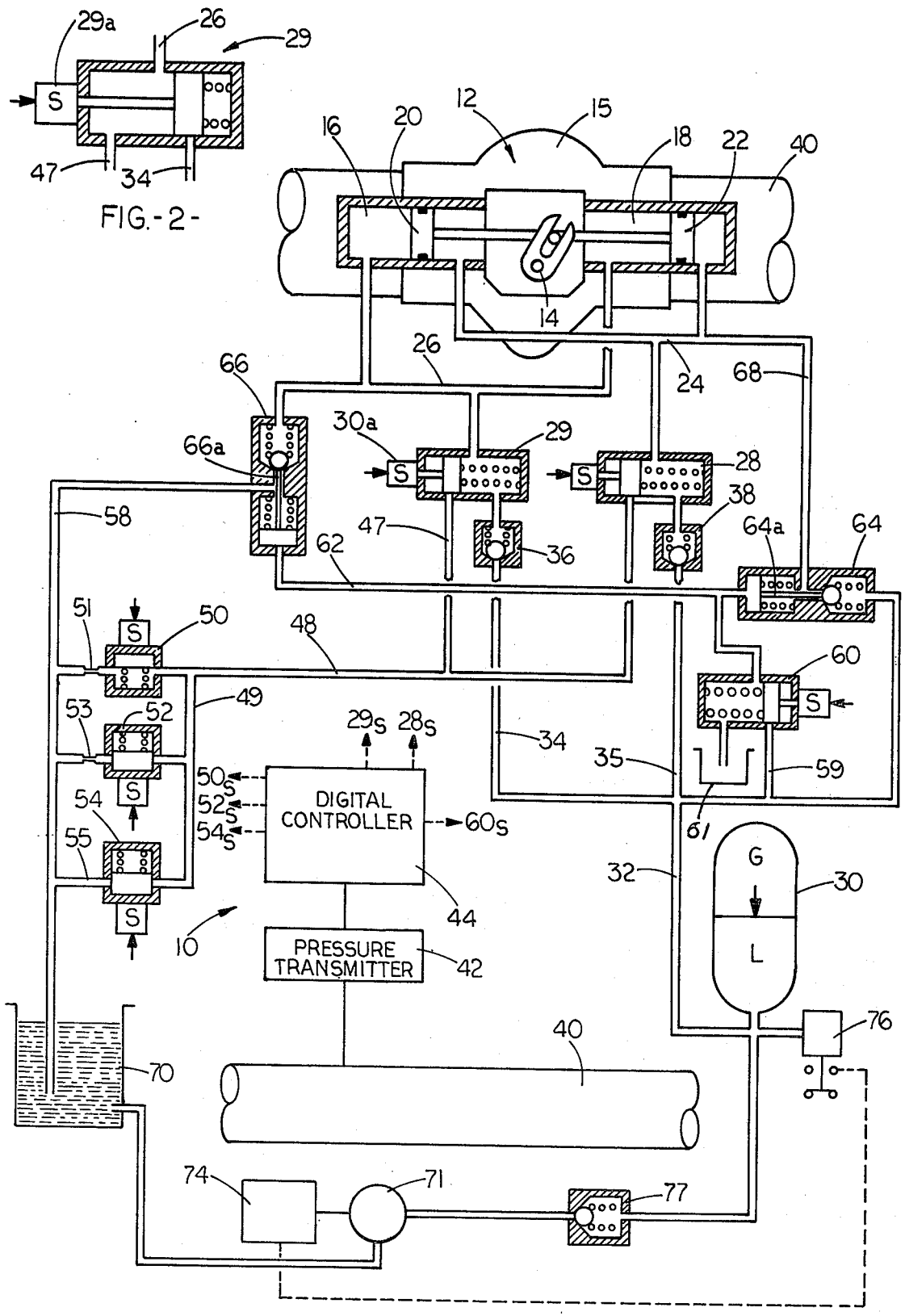

SYSTEM FOR PRECISE POSITION CONTROL

RELATED APPLICATION

This application is a continuation-in-part of my copending application Ser. No. 903,727 filed May 8, 1978 for "Rate Control System for a Positioning Device", now abandoned.

BACKGROUND OF THE INVENTION

In many operations involving the movement of a member under pressure-fluid control, there is a requirement or at least a desire, for rapid movement to a precisely defined position. For example, in automatic operation of a valve for controlling pipeline flow, it is desirable to have the control valve move rapidly when there is a substantial deviation from a desired flow characteristic, but it is also desirable that the adjusted setting of the valve be reached with precision, to avoid a cycling operation. In the case of sizable pipeline valves a small movement of the valve can effect a substantial change in the process variable. Accordingly in order to maintain precise control it is necessary to terminate movement immediately upon reaching the control point. However, if the rate of valve movement is high, it is extremely difficult to terminate same with the desired precision. Accordingly, it is desirable to slow the valve during the final increment of movement to facilitate precision termination. Another related problem is encountered in analog control devices. Specifically, when a reversal of direction is dictated, it is necessary for the controlling element to continue in its original direction until flow can be shut off, before it can reverse and commence flow in the opposite direction.

OBJECT OF THE INVENTION

It is an object of this invention to provide a rate control system for a pressure fluid operated positioning device which will enable pressure fluid operation at digitally selectable rates.

It is a further object of this invention to provide a pressure fluid-operated positioning device which may be moved rapidly toward a desired control, but which may be slowed thereafter to facilitate precise termination when such control is reached.

It is a further object of this invention to provide a pressure fluid-operated positioning device which may be slowed as a desired control position is neared to compensate for control valve operating time, and thereby enable precise termination at such control point.

It is a further object of this invention to provide a pressure fluid-operated positioning device which may be reversed as necessary without delay and without first passing through a null condition.

It is an object of this invention to provide a means to position accurately a pressure-fluid operated positioning device, through close control of incremental fluid displacement to and from said positioning device, and to hold said position until movement is required, thereby eliminating the unnecessary consumption of fluid power.

It is a further object of this invention to provide a rate control system for a hydraulic valve actuator which will enable valve operation with a large number of closely defined rates so as to achieve a combination of rapid response and positioning resolution.

Other objects and advantages of this invention will become apparent from the description to follow, particularly when read in conjunction with the accompanying drawing.

SUMMARY OF THE INVENTION

In carrying out this invention, there is provided a double-acting hydraulic cylinder which functions as a positioning device, as for example, as an actuator for a rotary valve. A pair of switch valves, each of which is connected to a source of pressure fluid and to an exhaust zone, such as a reservoir, are in turn connected to the cylinder on opposite sides of the hydraulic ram. Hence, each side of the piston may be pressurized or evacuated, depending upon the position of its switch valve. The switch valves are normally in the position to block flow to the exhaust line while remaining open to the source of pressure, so that the potential for flow, when required, is always present. One-way check valves in the supply lines prevent reverse flow from the cylinder ensuring a hydraulic lock. The switch valves are actuated by a digital controller in response to an electrical error signal in accordance with the direction of movement required to correct the error indicated by the signal. In the exhaust line there is connected in parallel an array of binary (on-off) valves which is under the control of the digital controller. Each binary valve has a flow capacity which is some multiple of that of the next smaller valve so as to provide a substantial number of flow rate combinations, each of which is precisely determined. The wide range of flow rate combinations makes possible a wide range of closely controlled rates of movement. Hence, a first signal activates the switch valves to dictate direction of movement, and subsequent signals control rates of flow, i.e. rates of movement over the full range of movement.

BRIEF DESCRIPTION OF THE DRAWING

In the drawing:

FIG. 1 is a schematic diagram of a hydraulic system embodying features of this invention; and FIG. 2 is a partial schematic of a component of the system of FIG. 1.

DESCRIPTION OF A PREFERRED EMBODIMENT

Referring now to the drawing with greater particularity, the positioning system 10 of this invention could be employed to control a wide variety of pressure fluid-operated positioning devices, such as a quarter-turn actuator 12 which may be keyed to the stem 14 of a rotary valve, such as a ball or plug valve 15. A clockwise rotation of the stem 14 opens valve 15, and a counter-clockwise rotation closes it. The actuator 12 may include a pair of aligned cylinders 16 and 18 with interconnected pistons 20 and 22. A first supply-exhaust line 24 brings the righthand ends of the cylinders 16 and 18 into communication and a second supply-exhaust line 26 connects the lefthand ends.

The actuator 12 is normally held at any set position at full supply pressure by means of normally open three-way switch valves 28 and 29 which direct a hydraulic fluid under pressure, from a suitable source of supply 30 through manifold duct 32 and supply ducts 34 and 35. A hydraulic lock, which fixes the position of the pistons 20 and 22 in any position to which they may be moved, is ensured by one-way check valves 36 and 38 which prevent reverse flow through the lines 34 and 35 and keep the cylinders 16 and 18 fully charged. The pressure fluid source 30 may take the form of a hydropneumatic accumulator charged with a gas G to maintain the hydraulic fluid L at a working pressure.

The valve 15, which is under control of the actuator 12, could be used to control a variety of flow characteristics, such as the pressure of a gas in a pipeline 40 by varying open positions of the valve in response to signals indicative of pressure deviations or dictated variations. The pipeline pressure could be sensed by a pressure transmitter 42 which delivers a proportional electrical signal to a digital controller 44. The digital controller in turn, actuates a plurality of solenoid operated valves, as will now be described.

For example, the pressure transmitter 42 may detect excessive line pressure and feed an appropriate signal to the digital controller wherein there is determined a new open position of the valve 15 necessary to correct the situation. A signal 29s energizes the solenoid 29a of the three-way switch valve 29, 30 to move it to the position shown in FIG. 2. This conditions the system for evacuation of the cylinders 16 and 18 on the left side of the pistons 20 and 22 through lines 26 and 48. Hence, the system is conditioned to provide direction of movement, and with the cylinders 16 and 18 fully charged, the potential for effecting such movement is always present.

Connected to the line 48 is a manifold line 49, and connected in parallel between the manifold 49 and an exhaust line 58 is an array of binary control valves 50, 52 and 54. These valves provide precise control over the rate of operation of the actuator 12 and are activated by solenoids in response to signals 50s, 52s and 54s, from the digital controller.

While the binary valves are illustrated as separate components, it is to be understood, of course, that they could take the form of a single control valve housing having a plurality of flow restrictions. In any event, each restriction 51, 53 and 55 has a flow capacity which is a multiple, e.g. double, that of the next smaller size. The number of discrete flow rates is determined by the number of restrictions that may be selected, in accordance with the equation:

$$R = (2^n) - 1$$

where
R = number of discrete flow rates, and
n = number of digitally selectable flow restriction.
Hence, with the three restrictions shown $$R = 2^3 - 1 = 7$$

Hence, a range of seven discrete and precise flow rates is possible with the different size restrictions 51, 53 and 55.

While the three binary valves 50, 52 and 54 may be closed when either switch valve 28 or 29 is opened, I prefer that one of the valves, say 50, be normally open, particularly between operations, to open the lines 48 and 49 to atmosphere and ensure draining. Further, when small errors are to be corrected, minimal flow through the already open valve 50 is effected without need of an electrical signal to the binary valve array 50, 52 and 54. When the appropriate switch valve 28 or 29 is energized, flow commences immediately. If on the other hand, it is deemed desirable to commence a signalled rapid flow uniformly a signal may be transmitted to close the small digital valve 50 and temporarily close off the exhaust path 48, 49 when the appropriate switch signal 28s or 29s is transmitted. Then, depending upon the amount of movement needed, appropriate signals from the digital controller 44 open those of the binary valves 50, 52 and 54 needed to produce the desired rate of movement.

For example, in operation, the digital controller 44 may receive an electrical signal from pressure transmitter 42 indicating a decline in line pressure with respect to a desired set point (desired value) downstream of the valve 15. The digital controller then sends a signal 28s to energize the solenoid 28a of switch valve 28 to condition the system for evacuation of the right side of the cylinders 16 and 18. Then, the digital controller may send signals 52s and 54s to actuate binary valves 52 and 54 for full capacity operation of the actuator 12, moving the valve 15 rapidly to a more open position. Finally, as the ultimate valve position is approached, one, two or all of the valves 50, 52 and 54 may be closed to slow operation of the actuator 12 until the required position is reached, at which time switch valve 28 is inactivated to return the system to a stable position in hydraulic lock.

If desired, there may be provided a by-pass system for high speed operation, as in emergency closing of the valve. For example, in the event of a pipeline break, there may be provided in a branch 59 from the supply manifold 34, an additional three-way valve 60 which is normally closed to fluid pressure and open to drain 61, in order to vent the pilots to be described. When the valve 60 is opened in response to a signal 60s of the digital controller, it directs fluid from the pressure source 32 to the line 62, opening a pair of pilot operated check valves 64 and 66. When check valve 64 is unseated by pin 64a, pressure fluid flows from line 34 to line 68 and then to the righthand side of cylinders 16 and 18. The opening of check valve 66 by pin 66a enables exhaust flow from the lefthand end of the cylinders through line 26 directly to an exhaust line 58 on the downstream side of binary valves 50, 52 and 54, by-passing same.

From exhaust line 58 the pressure fluid flows to a reservoir 70 from where it may be delivered to the accumulator 30 by means of a pump 71 driven by motor 74 energized by a pressure switch 76, which is actuated should pressure in the accumulator 30 deteriorate below a predetermined level. A one-way check valve 77 prevents reverse flow.

In normal operation, the array of binary valves 50, 52 and 54 provides a plurality of precise, determinable exhaust flow rates the reservoir 70 from the fully charged cylinders 16 and 18. The primed cylinders enable immediate movement of the controlled member 15, and changes in flow rates, whether slight or substantial, may also be made without delay, simply by signaling the desired combination of binary valves. This provides, more predictable operation of the driven member, and in the case of a valve actuator 12, enables it to maintain closer, more predictable control of the final control element which it is operating.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A system for precise control of flow through a rotary pipeline valve comprising:
   a rotary valve positioned in a pipeline;
   a double acting hydraulic cylinder including a piston adapted to drive said rotary valve in opposite directions through a quarter turn between full open and closed positions;
   a source of pressure fluid;
   a low pressure exhaust zone;
   pressure conduit means connected from said pressure source;
   exhaust conduit means connected to said exhaust zone;
   first and second duct means, connected to said cylinder on first and second sides of said piston respectively;
   signal actuated direction control switch valve means in each of said first and second duct means, operable in a first position to enable flow from said pressure conduit means and to block flow to said exhaust conduit means and in a second position to block flow from said pressure conduit means and enable flow to said exhaust conduit means;
   said cylinder being conditioned to turn said valve toward closed position when said first duct means is connected to said pressure conduit means and said second duct means is connected to said exhaust conduit means;
   both of said direction control switch valve means being normally in said first position;
   a one-way valve on the inlet side of each of said switch valve means preventing reverse flow through said pressure conduit means;
   signal actuated rate control means including three flow lines connected in parallel in said exhaust conduit means, and an on-off binary valve in each of said flow lines, the flow capacity of each of said binary valves being a multiple of the flow capacity of the next smaller binary valve;
   said direction control switch valve means and said rate control binary valves being electrical signal-actuated from a normal position;
   means biasing one of said binary valves into a normally open position and means biasing the other binary valves into a normally closed position;
   a pressure transmitter connected to said pipeline and operative to transmit signals to said controller representative of a pipeline flow characteristic; and
   a controller operable to transmit electrical signals, when signals from said transmitter indicate a deviation of said flow characteristic from a selected value, a direction signal to that one of said direction control switch valve means for correction of flow characteristic and, when the needed rate of correction exceeds the capacity of said one binary valve, a rate signal to selected ones of said other binary valves.

2. The system defined by claim 1 wherein:
   said controller is operable to transmit a preliminary signal to switch said one binary valve to closed position prior to transmission of said rate signal.

3. The system defined by claim 1 including:
   a first emergency by-pass line from said source of pressure to said cylinder on said first side of said piston;
   a second emergency by-pass line from said second side of said piston to said exhaust zone;
   normally closed by-pass valves in said by-pass lines; and
   signal means operated by said controller for effecting the opening of said normally closed valves.

4. The system defined by claim 3 wherein:
   said by-pass valves are check valves which normally prevent flow through said by-pass lines;
   pressure-responsive, movable members operative to unseat said check valves;
   a by-pass actuator duct means connected from said source to said movable members; and
   a normally closed emergency valve in said actuator duct means;
   said emergency valve being operable to open by a signal from said controller.

5. The system defined by claim 4 wherein:
   said emergency valve is a three-way valve which is normally open to exhaust to drain said actuator duct.

6. The system defined by claim 1 wherein:
   the flow capacity of each binary valve is twice that of the next smaller binary valve.

7. The system defined by claim 1 wherein:
   the flow capacity of said one binary valve is less than that of either of said other binary valves.

* * * * *